United States Patent [19]

Miller

[11] Patent Number: 4,560,152

[45] Date of Patent: Dec. 24, 1985

[54] SWING CLAMP

[75] Inventor: Douglas P. Miller, Crystal Lake, Ill.

[73] Assignee: Applied Power Inc., Brookfield, Wis.

[21] Appl. No.: 604,823

[22] Filed: Apr. 27, 1984

[51] Int. Cl.[4] ................................................ B23Q 3/08

[52] U.S. Cl. ........................................ 269/24; 269/27; 269/91

[58] Field of Search ........................ 269/27, 24, 32, 91, 269/93; 92/2, 33

[56] References Cited

U.S. PATENT DOCUMENTS

| | | | |
|---|---|---|---|
| 2,952,145 | 9/1960 | Thompson . | |
| 3,173,673 | 3/1965 | Northern et al. . | |
| 3,186,775 | 6/1965 | Beezer . | |
| 3,572,216 | 3/1971 | Seesody | 269/32 |
| 3,823,651 | 7/1974 | Ogilvie . | |
| 3,948,502 | 4/1976 | Waller et al. | 269/32 |
| 4,351,516 | 9/1982 | Ersoy et al. | 269/32 |

FOREIGN PATENT DOCUMENTS

| | | |
|---|---|---|
| 1022462 | 7/1950 | France . |
| 2039366 | 1/1971 | France . |
| 8206099 | 4/1982 | France . |
| 222095 | 12/1968 | U.S.S.R. . |
| 320364 | 2/1972 | U.S.S.R. . |

*Primary Examiner*—Robert C. Watson

*Attorney, Agent, or Firm*—Andrus, Sceales, Starke & Sawall

[57] ABSTRACT

A powered work clamping device includes a housing having an upper chamber and a lower chamber, and a piston in the lower chamber connected to an index rod which projects into the upper chamber. The index rod is axially movable but not rotatably movable, and is biased to an upper position. A plunger extends from the housing and has a work engaging member at one end with a piston at its other end disposed within the upper chamber. The plunger is mounted on the index rod for axial and rotative movement, and is biased to a retracted clamped position. To unclamp a workpiece, hydraulic fluid is directed to a valve assembly within the device which sequentially delivers fluid first to the upper chamber to extend the plunger and then to the lower chamber to axially move the index rod and its piston to swing the plunger. To clamp a workpiece, hydraulic pressure is removed so that fluid first flows from the lower chamber through the check valve assembly to tank due to the biasing force on the index rod to swing the plunger, and then fluid in the upper chamber flows through the check valve assembly to tank due to its biasing force to retract the plunger and clamp a workpiece.

10 Claims, 5 Drawing Figures

FIG. 3
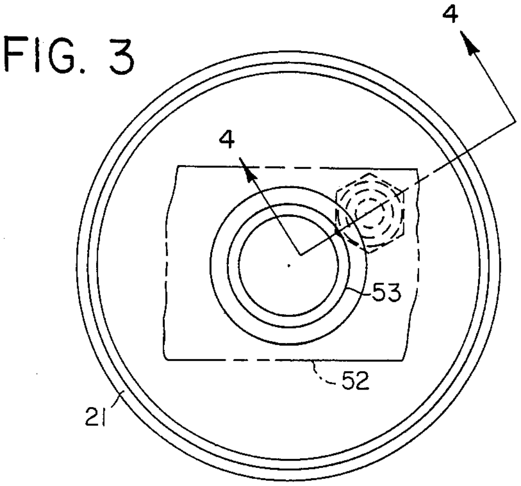
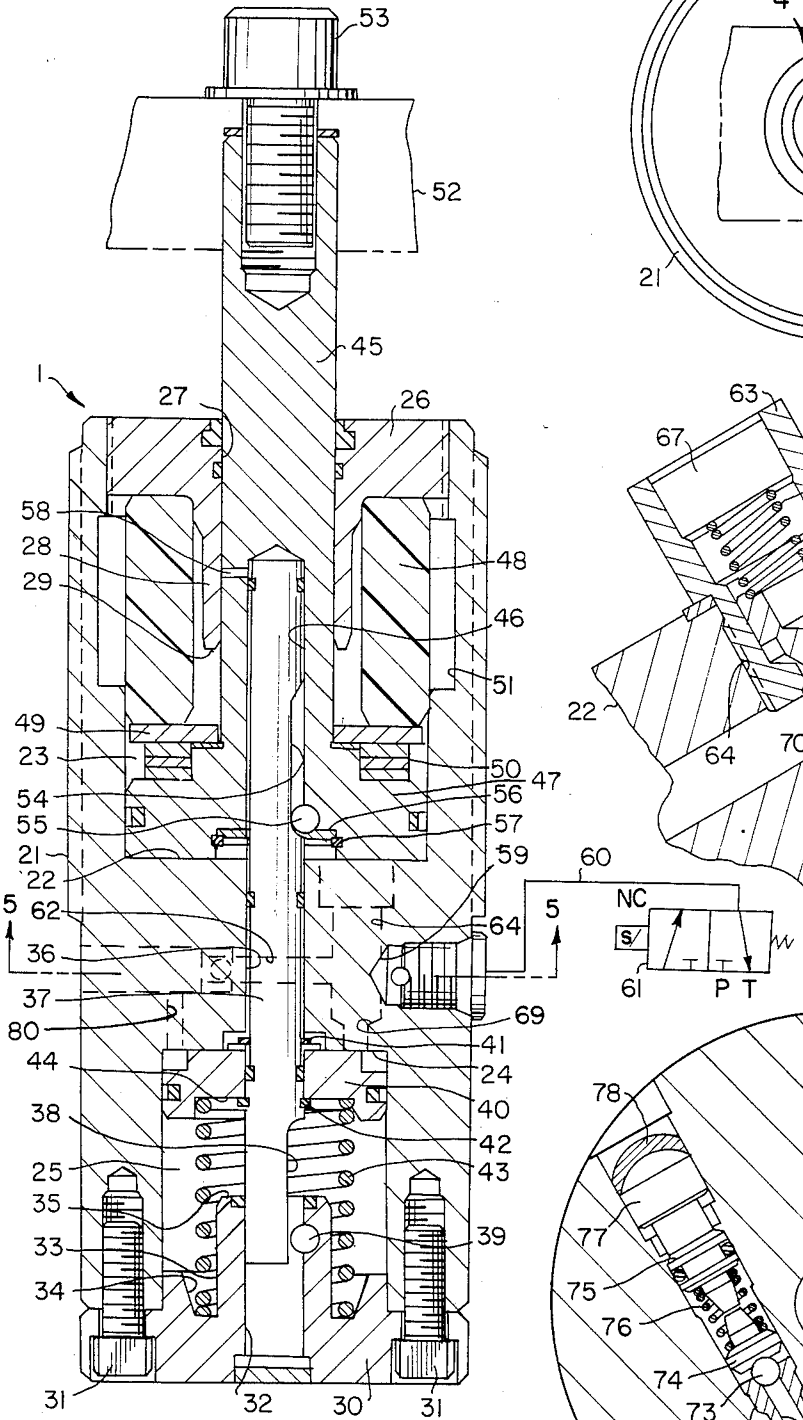
FIG. 2
FIG. 4
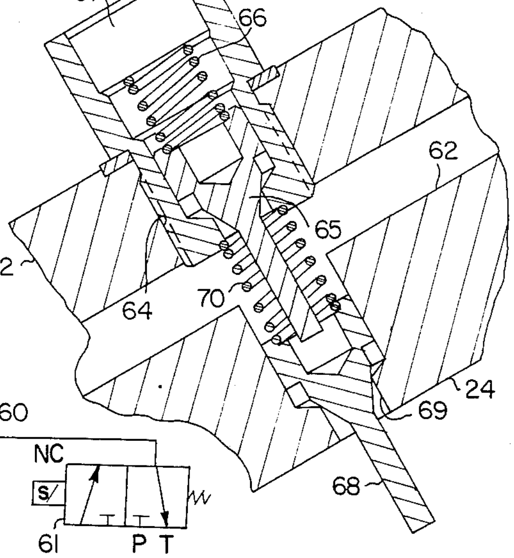
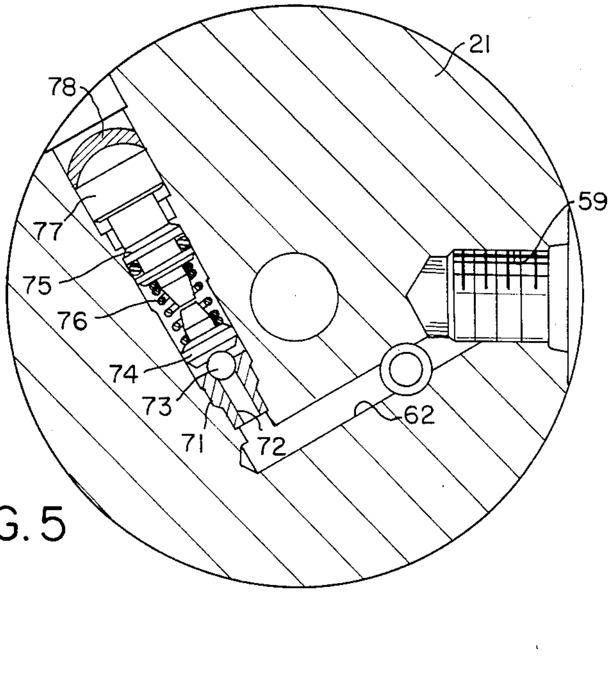
FIG. 5

SWING CLAMP

BACKGROUND OF THE INVENTION

The present invention relates to work holders, and more particularly to a swing clamp for holding a workpiece.

Powered work clamping devices or swing clamps are typically used on machine tools to hold a workpiece on a table or jib while a mechanical operation such as milling, drilling, or grinding is performed. Swing clamps may be hydraulically or pneumatically powered, and as schematically shown in FIG. 1 generally include a housing 1 defining an upper chamber 2 and a lower chamber 3, a piston 4 disposed in upper chamber 2 connected to a plunger 5 having a work-engaging head 6 thereon, and a piston 7 in lower chamber 3 connected to a rod 8 which is slidably received within plunger 5. Such swing clamps also typically include three solenoid actuated two position flow control valves for controlling the flow of hydraulic fluid to and from the clamp. As shown, valve 9 is normally opened and is connected via line 10 to port A at the upper end of chamber 2. A second normally closed valve 11 is connected via line 12 to port C at the upper end of chamber 3 and via line 13 to port B at the lower end of chamber 2. A third normally closed valve 14 is connected via line 15 to the lower end of chamber 3.

FIG. 1 also shows sequentially the steps for clamping and unclamping a workpiece 16 on a table 17. In its home position, head 6 is retracted within table 17 with valve 14 normally closed so that tank pressure is communicated to port D, valve 11 normally open so that tank pressure is communicated to ports B and C, and valve 9 is normally open applying working pressure to port A thus holding head 6 in a retracted position. To extend head 6, valves 9, 11 and 14 are all energized so that working pressure is communicated to ports B, C, and D and tank pressure is communicated to port A. To swing head 6, valve 14 is de-energized so that tank pressure is communicated to port D and piston 7 may be moved downwardly in chamber 3. A rotation mechanism (not shown) coacting between plunger 5 and rod 8 causes head 6 to swing as rod 8 and piston 7 are moved downwardly. To clamp workpiece 16, all three valves 9, 11, and 14 are de-energized so that work pressure is applied at port A and tank pressure is communicated to ports B, C and D. To unclamp workpiece 16, head 6 is first extended by energizing valves 9 and 11 so that work pressure is applied to port B to extend head 6. Head 6 is then rotated by energizing valves 9 and 14 and de-energizing valve 11 so that tank pressure is communicated to ports A, B and C, and work pressure is applied to port D so that piston 7 and rod 8 move upwardly to coact with plunger 5. Finally, to retract head 6 into its home position, valve 14 is energized and valves 9 and 11 are de-energized so that work pressure is felt at port A to move piston 4, plunger 5 and head 6 downwardly.

A swing clamp system such as that shown in FIG. 1 are relatively expensive since it requires three control valves (9, 11, and 14) for its operation. It is thus desireable to provide a swing clamp system that employs a single control valve so that the cost of such a control system can be minimized and the operation simplified.

SUMMARY OF THE INVENTION

A powered work clamping device or swing clamp for holding a workpiece. The device needs only a single control valve and a single inlet port to provide its clamping operation. The device thus simplifies a clamping operation and reduces costs.

The device includes a housing having an upper chamber and a lower chamber, a piston disposed in the lower chamber and connected to an index rod for coincident axial movement therewith between upper and lower positions, and a plunger extending from the housing having a work engaging member at one end and a piston at its other end disposed within the upper chamber. The plunger is mounted for axial and rotative movement with respect to the index rod, and is slidably movable between extended and retracted positions. The device also includes first spring means for biasing the plunger in its retracted position, and second spring means for biasing the index rod to its upper position. Anti-rotation means prevents rotation of the index rod, and rotation means coacting between the index rod and the plunger rotates the plunger when the index rod is moved to its lower position.

The device includes valve means for sequentially delivering pressurized fluid first to the upper chamber to move the plunger from its retracted to its extended position, then to the lower chamber to move the index rod to its lower position to swing the work engaging member so that a workpiece may be inserted or withdrawn. When pressure is removed from the inlet port, the valve means first permits passage of fluid from the lower chamber under the biasing force of the second spring means so that the work engaging member will swing to a clamp-ready position, and then permits fluid to pass from the upper chamber under the biasing force of the first spring means causing the plunger and work-engaging member to retract and clamp a workpiece.

The present invention thus provides a swing clamp which not only simplifies a clamping operation, but also reduces costs and has a relatively short stroke which is particularly advantageous for working in confined areas.

BRIEF DESCRIPTION OF THE DRAWINGS

The drawings illustrate the best mode presently contemplated of carrying out the invention.

In the drawings:

FIG. 2 is a cross-sectional side view in elevation of a swing clamp constructed in accordance with the principles of the present invention;

FIG. 3 is a top view of the swing clamp shown in FIG. 2;

FIG. 4 is a fragmentary cross-sectional view taken along the plane of the line 4—4 in FIG. 3 showing the check valve assembly employed with the present swing clamp; and FIG. 5 is a cross-sectional view taken along the plane of the line 5—5 in FIG. 2 illustrating the sequence valve employed with the present swing clamp.

DESCRIPTION OF THE PREFERRED EMBODIMENT

Figure 1:
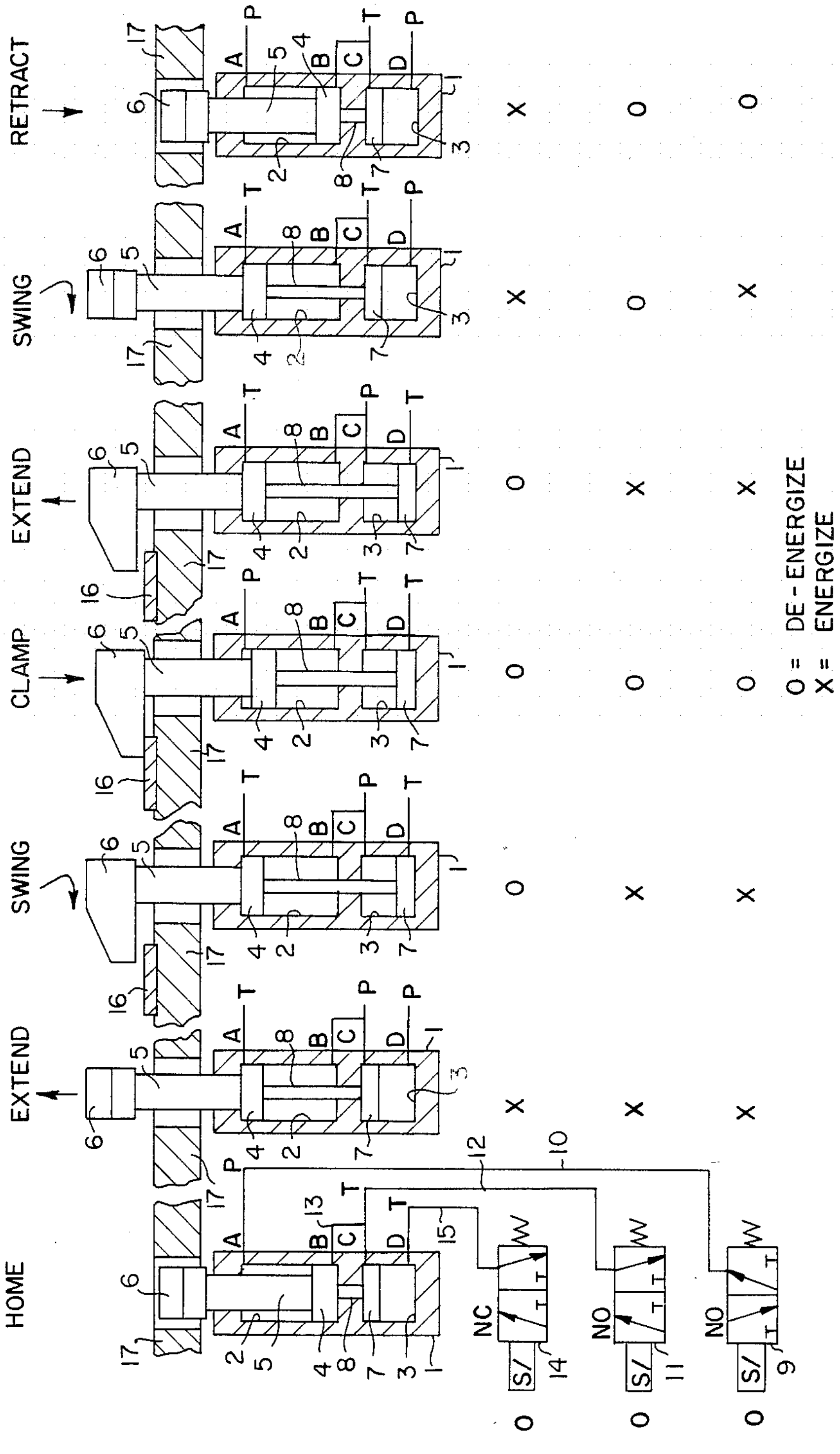
FIG. 1 PRIOR ART
FIG. 1 is a schematic illustration of the operation and features of a prior art swing clamp.

Referring now to the drawings, FIG. 2 illustrates a swing clamp, designated generally by the numeral 20, constructed in accordance with the principles of the present invention. Swing clamp 20 includes a cylindrical housing 21 having a central web portion that separates a surface 22 that defines an upper chamber 23 and a surface 24 that defines a lower chamber 25. Upper chamber 23 is closed off by an end cap 26 which includes a central opening 27. An integral sleeve 28 depends from the bottom of cap 26 and projects into chamber 23 coaxially with respect to opening 27. The lower end of sleeve 28 defines an annular abutment surface or stop surface 29, the purpose of which will hereinafter be described.

Lower chamber 25 is closed off by an end cap 30 which is mounted on housing 21 by screws 31. End cap 30 includes a central opening 32, an integral sleeve 33 projecting upwardly into lower chamber 25 and an annular recessed area 34 surrounding the base of sleeve 33. The outer end of sleeve 33 includes an annular abutment or stop surface 35, the purpose of which will hereinafter be described.

The web portion of housing 21 includes a central opening 36 which slidably receives an index rod 37. Index rod 37 is axially slidable in opening 36 along its longitudinal axis between upper and lower positions, and has its upper end projecting into upper chamber 23 and its lower end projecting into lower chamber 25 and received within opening 32. The lower end of index rod 37 includes a straight groove 38 formed therein which cooperates with a pin 39 mounted within sleeve 33 in such a manner that it projects into opening 32. Groove 38 and pin 39 provide an anti-rotation means for preventing rotation of index rod 37 about its longitudinal axis.

A piston 40 is disposed in lower chamber 25 and is connected to index rod 37 for coincident axial movement therewith. Piston 40 is fixed to index rod 37 by means of a pair of retaining rings 41 and 42 disposed on opposite sides thereof. A coil spring 43 is disposed in lower chamber 25 and is seated at its lower end in recessed area 34 and at its upper end in a recessed area 44 formed in the bottom surface of piston 40. Spring 43 acts against piston 40 to bias piston 40 and index rod 37 to their upper positions.

A plunger 45 extends from housing 21 through opening 27 in cap 26 and is slidably and rotatably mounted on the upper end of index rod 37. Plunger 45 is slidably movable between a retracted or clamped position, as shown in FIG. 2, and an extended or unclamped position. In order to accomplish this, the lower end of plunger 45 includes a central longitudinal opening 46 for slidably receiving the upper end of index rod 37, and an integral piston 47 formed at its lower end receivable in upper chamber 23. A urethane spring 48 biases piston 47 and plunger 45 to their retracted positions. Spring 48 is annular in configuration and its upper end bears against the lower surface of end cap 26, and its lower surface bears against a washer 49 which in turn bears against a thrust bearing 50. Upper chamber 23 includes an annular expansion chamber 51 formed in housing 21 which receives the bulging urethane material when spring 48 is compressed.

The outer or upper end of plunger 45 includes a work engaging member or head 52 which is fixed thereto by means of a threaded screw 53. Head 52 may be L-shaped substantially as shown in FIG. 1, or may be T-shaped depending upon whether one or two workpieces are to be held by clamp 20. Plunger 45 and head 52 are rotatable between a first clamp-ready position, as shown in FIG. 2, and a second position wherein head 52 swings 90° so that the workpiece may be inserted or removed.

As a rotation means for rotating plunger 45 with respect to index rod 37, rod 37 includes a groove 54 formed therein at its upper end, and a pin 55 connected to piston 47 that projects into opening 46 to engage groove 54. Pin 55 is fixed to piston 47 by means of a washer 56 and retaining ring 57. Groove 54 includes a lower straight portion which permits plunger 45 to be moved upwardly with respect to index rod 37 a short distance prior to rotation or swinging of head 52. This permits head 52 to be extended to release a workpiece prior to pin 55 coacting with the upper helical portion of groove 54 to rotate or swing head 52.

Plunger 45 also includes a passageway 58 that communicates between opening 46 and the inner surface of sleeve 28. Passageway 28 provides an air bleed or vent for the system and also permits oil flow in case of any leakage.

Housing 21 includes an inlet port 59 which is connected via line 60 to a solenoid actuated two position flow control valve 61 which in turn leads to a source of pressurized fluid (not shown) such as a hydraulic pump. As shown, valve 61 is normally closed so that tank pressure is applied to inlet port 59.

Referring now to FIGS. 3–5, there is shown valve means for sequentially delivering hydraulic fluid through inlet port 59 to accomplish extension, swinging, and retraction of head 52 to clamp and unclamp a workpiece. Referring first to FIGS. 3 and 4, there is shown a check valve assembly communicating with passageway 62 which communicates with inlet port 59. The check valve assembly includes a cylindrical valve body 63 disposed in a threaded opening 64 communicating between passageway 62 and upper chamber 23. Valve body 63 houses a valve element 65 having an elongate long end and a cone shaped upper end which cooperates with a seat formed in body 63 in a fluid tight relationship. Valve element 65 is biased against the seat of body 63 by means of a coil spring 66. One end of coil spring 66 bears against valve element 65 and the other end bears against a threaded hollow set screw 67. A second valve element 68 is slidably disposed in an opening 69 communicating between passageway 62 and lower chamber 25. Valve element 68 is identical in shape to valve element 65 and includes an elongate lower end which projects into lower chamber 25 and a cone shaped upper end which cooperates with a seat formed in opening 69 in a fluid tight manner. Valve element 68 is biased to its seated position by means of a coil spring 70. Coil spring 70 has one end bearing against valve body 63 and its other end bearing against valve element 68.

FIG. 5 shows a relief or sequence valve which is also disposed in passageway 62. The relief or sequence valve includes a seat member 71 having a central opening 72 formed therethrough. A ball 73 is seated at one end of opening 72 and is guided in its movement by a ball guide 74. A plug 75 holds guide 74 in position, by means of a coil spring 76 which extends between plug 75 and guide 74 to bias guide 74 against ball 73 to hold ball 73 in a normally closed position. A threaded set screw 77 holds the assembly together and may be used to adjust the biasing force of spring 76. A valve plug 78 completes the assembly so that tampering with adjustment is prevented. Movement of ball 73 off its seat will permit passage of hydraulic fluid from passageway 62 through opening 72 and past ball 73 to a passageway 80 (see FIG. 2) which communicates with lower chamber 25.

In order to clamp and unclamp a workpiece, and assuming that swing clamp 20 is in the position shown in FIG. 2 with plunger 45 retracted and index rod 37 in its upper position, an operator would first energize valve 61 to deliver pressurized fluid to inlet port 59 and passageway 62. Since the sequence valve is set to open at a pressure greater than that of valve element 65, and since valve element 68 is checked off, fluid in passageway 62 will first unseat valve element 65 and flow into upper chamber 23 moving piston 47 and plunger 45 upwardly from its retracted position to its extended position. Piston 47 and plunger 45 will continue to extend upwardly until washer 49 engages stop surface 29 whereupon movement of plunger 45 stops. During this upward movement, pin 55 rides in the straight portion of groove 54 so that head 52 does not rotate. When washer 49 engages stop surface 29, pin 55 is located just adjacent to the beginning of the helical portion of groove 54. Since piston 47 and plunger 45 can no longer move, fluid pressure in upper chamber 23 and passageway 62 increases because valve 61 is still in its energized position until pressure has increased a sufficient amount to unseat ball 73 in the sequence valve (FIG. 5). Once ball 73 is unseated, fluid will flow from passageway 62 through passageway 80 into lower chamber 25. As fluid enters lower chamber 25 it forces piston 40 and index rod 37 downwardly to their lower position until piston 40 engages stop surface 35. Simultaneously, pin 55 rides in the helical portion of groove 54 to rotate or swing head 52 90°.

Once a workpiece has been properly positioned or removed, valve 61 is deenergized so that fluid pressure is removed from inlet port 59. When this occurs, the biasing force of spring 43 moves piston 40 and index rod 37 upwardly whereupon fluid in chamber 25 forces valve element 68 off its seat so that fluid may flow through opening 69 into passageway 62 and back to tank. As piston 40 and index rod 37 are moved to their upper positions, pin 55 rides downwardly in the helical portion of groove 54 to rotate or swing head 62 90° to its clamp-ready position over the workpiece.

As piston 40 and index rod 37 move upwardly, the upper surface of piston 40 will engage the elongate lower end of valve element 68 to slide element 68 against the force of spring 70 until it engages the elongate lower end of valve element 65 and forces element 65 off its seat. Once element 65 is off its seat, urethane spring 48 forces plunger 45 and piston 47 to retract downwardly since fluid in upper chamber 23 may now flow through valve body 63 into passageway 62 and then through line 60 to tank. Urethane spring 48 continues to retract plunger 45 until head 52 engages the workpiece. The spring force of urethane spring 48 provides a positive lock or clamping force to hold the workpiece.

A swing clamp has been illustrated and described for holding a workpiece in a clamp position. Various modifications and/or substitutions of the components specifically described herein may be made without departing from the scope of the invention. For example, a coil spring may be substituted for the urethane spring described herein, or a different technique for rotating head 52 may be employed other than the pin and groove arrangements described herein. Additionally, a second fluid inlet port may be added to communicate with upper chamber 23 for delivering hydraulic fluid to chamber 23 to power down plunger 45 instead of utilizing only the force of urethane spring 48.

Various modes of carrying out the invention are contemplated as being within the scope of the following claims particularly pointing out and distinctly claiming the subject matter which is regarded as the invention.

I claim:

1. A powered work clamping device, comprising:
a housing having a chamber therein;
a plunger extending from said housing including a work engaging member at one end and a piston at its other end disposed within said chamber, said plunger mounted for rotative movement about its longitudinal axis between first and second positions, and for axial movement between extended and retracted positions;
means for rotating said plunger between said first and second positions;
first biasing means for biasing said plunger toward its retracted position;
second biasing means for biasing said plunger toward its first rotative position;
a fluid inlet passageway communicating with said chamber and said rotation means; and
valve means in said passageway for sequentially directing pressurized fluid through said passageway first to said chamber to extend said plunger against said first biasing means and then to said rotation means to rotate said plunger against said second biasing means from its first position to its second position, and in the absence of pressurized fluid to permit return flow through said passageway first from said rotation means so that said plunger is rotated back to its first position by said second biasing means and then from said chamber to retract said plunger.

2. The device according to claim 1, wherein said housing includes a second chamber and said rotation means includes an index rod slidably mounted within said housing having one end projecting into one of said chambers and its other end projecting into the other of said chambers, and a second piston disposed within said other chamber and connected to said index rod for coincident axial movement therewith.

3. The device according to claim 2, wherein said rotation means further includes a helical groove formed in said one end of said index rod and a pin operative against said groove, and an anti-rotation means for preventing the rotation of said index rod.

4. The device according to claim 3, wherein said anti-rotation means includes a groove formed in said other end of said index rod and a pin engaging said groove to prevent rotation of said index rod.

5. The device according to claim 2, wherein said valve means includes a check valve assembly interposed between said passageway and said chambers, and a sequence valve interposed between said passageway and said second chamber.

6. A powered work clamping device, comprising:
a housing having an upper chamber and a lower chamber;
an index rod slidably mounted within said housing axially along its longitudinal axis between upper and lower positions, said index rod having one end projecting into said upper chamber and its other end projecting into said lower chamber;
a plunger extending from said housing having a work-engaging member at one end and a piston at its other end disposed within said upper chamber, said plunger mounted on said one end of said index rod for rotative movement with respect to said index rod about its longitudinal axis between first and second positions and for axial movement between extended and retracted positions;

first biasing means for biasing said plunger toward its retracted position;

a second piston disposed within said lower chamber and connected to said index rod for coincident axial movement therewith;

second biasing means for biasing said index rod toward its upper position;

anti-rotation means for preventing the rotation of said index rod;

rotation means cooperating between said index rod and said plunger for rotating said plunger between its first and second positions when said index rod is moved between its upper and lower positions;

a fluid inlet passageway communicating with both of said chambers; and valve means in said passageway for sequentially directing pressurized fluid through said passageway first to said upper chamber to extend said plunger against said first biasing means and then to said lower chamber to move said index rod to its lower position against said second biasing means to rotate said plunger to its second position, and in the absence of pressurized fluid to permit return flow through said passageway first from said lower chamber so that said second biasing means moves said index rod to its upper position to rotate said plunger back to its first position and then from said upper chamber so that said first biasing means moves said plunger to its retracted position.

7. The device according to claim 6, wherein said first biasing means is a urethane spring.

8. The device according to claim 6, wherein said anti-rotation means includes a straight groove formed in said other end of said index rod and a pin engaged in said groove.

9. The device according to claim 8, wherein said rotation means includes a helical groove formed in said one end of said index rod and a pin engaged in said groove.

10. The device according to claim 6, wherein said valve means includes a check valve assembly disposed between said passageway and said upper and lower chambers, and a sequence valve disposed between said passageway and said lower chamber.

* * * * *